(12) United States Patent
Kodama et al.

(10) Patent No.: US 8,807,836 B2
(45) Date of Patent: Aug. 19, 2014

(54) ROTATING DEVICE

(75) Inventors: Mitsuo Kodama, Fujieda (JP); Taketo Nonaka, Fujieda (JP); Masafumi Mizuno, Fujieda (JP)

(73) Assignee: Samsung Electro-Mechanics Japan Advanced Technology Co., Ltd., Fujieda (JP)

( * ) Notice: Subject to any disclaimer, the term of this patent is extended or adjusted under 35 U.S.C. 154(b) by 72 days.

(21) Appl. No.: 13/488,865

(22) Filed: Jun. 5, 2012

(65) Prior Publication Data

US 2013/0322793 A1 Dec. 5, 2013

(51) Int. Cl.
 *F16C 21/00* (2006.01)
 *F16C 32/06* (2006.01)

(52) U.S. Cl.
 USPC .......................................... 384/107; 384/112

(58) Field of Classification Search
 USPC ..................... 384/100–124; 310/90
 See application file for complete search history.

(56) References Cited

U.S. PATENT DOCUMENTS

| | | | |
|---|---|---|---|
| 5,533,811 A | 7/1996 | Polch et al. | |
| 6,991,376 B2 * | 1/2006 | Aiello et al. | 384/107 |
| 7,321,178 B2 * | 1/2008 | Wakitani et al. | 310/216.018 |
| 2006/0153478 A1 | 7/2006 | Yamada | |
| 2006/0182374 A1 * | 8/2006 | Schwamberger et al. | 384/107 |
| 2009/0140587 A1 | 6/2009 | Popov et al. | |
| 2010/0277833 A1 | 11/2010 | Sugiki | |
| 2010/0315742 A1 | 12/2010 | Kimura et al. | |
| 2010/0321823 A1 | 12/2010 | Oe et al. | |

FOREIGN PATENT DOCUMENTS

| | | |
|---|---|---|
| JP | 2006-275246 A | 10/2006 |
| JP | 2010-261580 A | 11/2010 |

* cited by examiner

*Primary Examiner* — Alan B Waits
(74) *Attorney, Agent, or Firm* — Holtz, Holtz, Goodman & Chick, PC (57) ABSTRACT

A rotating device includes a shaft body having a shaft, a first flange extending in the radial direction from the side face of the shaft, and a second flange extending outwardly of the radial direction from another end side, a freely rotatable bearing body including a shaft encircling member present between the second flange and the first flange in the axial direction, a radial dynamic pressure generating groove provided in either one of the shaft and the shaft encircling member, a first thrust dynamic pressure generating groove provided in either one of the first flange and the shaft encircling member, and a lubrication medium. An end of the region where the radial dynamic pressure generating groove is formed and which is distant from the second flange is located outwardly of the region where the first thrust dynamic pressure generating groove is disposed in the axial direction.

18 Claims, 5 Drawing Sheets

ROTATING DEVICE

BACKGROUND OF THE INVENTION

1. Field of the Invention

The present invention relates to a rotating device including a shaft body and a bearing body supporting the shaft body in a relatively rotatable manner.

2. Description of the Related Art

Rotating devices like a disk drive device are becoming compact and increasing the capacity thereof, and are built in various electronic devices. Such rotating devices are popularly built in, in particular, a hard disk drive that is a kind of disk drive devices of portable electronic devices, such as a laptop computer and a portable music player. The rotating devices like the disk drive device built in such portable electronic devices require improved shock resistance and vibration resistance (hereinafter, referred to as "vibration resistance characteristic, etc.,") so as to withstand a shock due to falling and a vibration when carried in comparison with the rotating devices built in stationary electronic devices like a desktop computer. Moreover, such rotating devices require thinning and weight saving in comparison with the rotating devices built in the stationary electronic devices like a desktop computer. In general, thinning and improvement of the vibration resistance characteristic, etc., are in a trade-off relationship.

One of the inventors of the present invention proposes a rotating device that is a disk drive device having a fluid dynamic bearing mechanism formed between a shaft body and a bearing body, and having the shaft body including a shaft fixed to a base in, for example, JP 2010-261580 A. According to the rotating device disclosed in JP 2010-261580 A, a radial dynamic bearing is formed in a space in the radial direction between the shaft body and the bearing body, and a thrust dynamic bearing is formed therebetween in a space in the axial direction.

In the case of the rotating device that is a disk drive device disclosed in JP 2010-261580 A, in order to improve the vibration resistance characteristic, etc., it is necessary to improve the rigidity of the radial dynamic bearing (hereinafter, referred to as a "radial rigidity"). To improve the radial rigidity, there is a scheme of making a space narrower in the radial direction between the shaft body and the bearing body both configuring a radial bearing. However, in the case of such a rotating device, if the space between the shaft body and the bearing body is too small, the shaft body and the bearing body contact with each other when the rotating device is rotating, disturbing the rotation thereof, and in the worst case, the shaft body and the bearing body are highly possibly damaged.

Moreover, in order to improve the radial rigidity, there is another scheme of extending the upper end or the lower end of a region where the radial dynamic bearing is formed in the axial direction so as to elongate the axial span of the radial bearing. However, in the case of the above-explained rotating device, an air-liquid interface in a capillary seal formed at the outer periphery of the flange 15, a thrust dynamic pressure generating part formed in a space between the flange 15 and the sleeve 14, and the upper end of the region where the radial dynamic bearing is formed are disposed in this order in the axial direction. That is, the upper limit of the upper end of the region where the radial dynamic bearing is formed is restricted by the flange 15.

Under such a circumstance, the restriction of the upper end of the region where the radial dynamic bearing is formed by the flange disturbs the improvement of the radial rigidity, and thus disturbing the improvement of the vibration resistance characteristic, etc.

In view of such a circumstance, the inventors of the present invention recognized that it is necessary to extend the upper end or the lower end of the region where the radial dynamic bearing is formed in the axial direction in order to improve the vibration resistance characteristic, etc., of the rotating device.

Such a technical issue arises in the case of the rotating device built in not only a portable electronic device but also other kinds of electronic devices.

The present invention has been made in view of such a circumstance, and it is an object of the present invention to accomplish both thinning and improvement of the vibration resistance characteristic, etc.

SUMMARY OF THE INVENTION

To achieve the object, an aspect of the present invention provides a rotating device that includes: a shaft body including a shaft, a first flange extending outwardly of a radial direction from a side face of the shaft at an end, and a second flange extending outwardly of the radial direction from a side face of the shaft at another end; a bearing body including a shaft encircling member which is present in a space between the first flange and the second flange in an axial direction and which encircles the shaft, and being freely rotatable relative to the shaft body; a radial dynamic pressure generating groove provided in either one of an outer periphery of the shaft and an inner periphery of the shaft encircling member; a first thrust dynamic pressure generating groove provided in either one of a surface of the first flange and the shaft encircling member facing with each other in the axial direction; and a lubricant present in a space between the shaft body and the bearing body, an end of a region where the radial dynamic pressure generating groove is disposed and which is most distant from the second flange is located outwardly of a region where the first thrust dynamic pressure generating groove is disposed in the axial direction.

Another aspect of the present invention provides a rotating device that includes: a shaft body including a shaft, a first flange extending outwardly of a radial direction from a side face of the shaft at an end, and a second flange extending outwardly of the radial direction from a side face of the shaft at another end; a bearing body including a shaft encircling member which is present in a space between the first flange and the second flange in an axial direction and which encircles the shaft, and being freely rotatable relative to the shaft body; a radial dynamic pressure generating groove provided in either one of an outer periphery of the shaft and an inner periphery of the shaft encircling member; a first thrust dynamic pressure generating groove provided in either one of a surface of the first flange and the shaft encircling member facing with each other in the axial direction; and a lubricant present in a space between the shaft body and the bearing body, the first flange including a first recess formed in a surface of the first flange facing the shaft encircling member in the axial direction and recessed in the axial direction, the shaft encircling member including a first protrusion corresponding to the first recess of the first flange and protruding in the axial direction, and an inner periphery of the first protrusion directly facing an outer periphery of the shaft in the radial direction.

Any combination of the above-explained structural elements and replacement of the structural element and the technical term of the present invention between a method, an apparatus, and a system, etc., are also effective as an embodiment of the present invention.

DETAILED DESCRIPTION OF THE PREFERRED EMBODIMENT

An explanation will be given of a preferred embodiment of the present invention with reference to the accompanying drawings. The same or similar structural element or member will be denoted by the same reference numeral throughout the figures, and the duplicated explanation will be omitted accordingly. The dimension of each member in the figure is enlarged or reduced as needed to facilitate understanding for the present invention. A part of the member not important to explain an embodiment of the present invention in the figure will be also omitted.

A rotating device of an embodiment is suitably used as, for example, a disk drive device like a hard disk drive on which magnetic recording disks for magnetically recording data are to be mounted and which rotates and drives the magnetic recording disks. The rotating device is suitably used as, in particular, a fixed-shaft disk drive device which has a shaft fixed to a base, and which causes a hub to rotate relative to the shaft. The rotating device of this type includes, for example, a rotating body that is attached to a static body via bearing means in a freely rotatable manner. The rotating body includes, for example, mounting means for mounting a drive-target medium like a magnetic recording disk. The bearing means includes, for example, radial bearing means formed at either one of the static body and the rotating body. The bearing means also includes, for example, thrust bearing means formed at either one of the static body and the rotating body. The thrust bearing means is, for example, located outwardly of the radial bearing means in the radial direction. For example, the radial bearing means and the thrust bearing means may generate dynamic pressure to a lubrication medium. The radial bearing means and the thrust bearing means may contain, for example, a lubrication fluid. The rotating device may include, for example, rotating-driving means for giving rotational torque to the rotating body. The rotating-driving means may be, for example, a brushless spindle motor. The rotating-driving means may also include, for example, a coil and a magnet.

<Embodiment>

Figure 1:
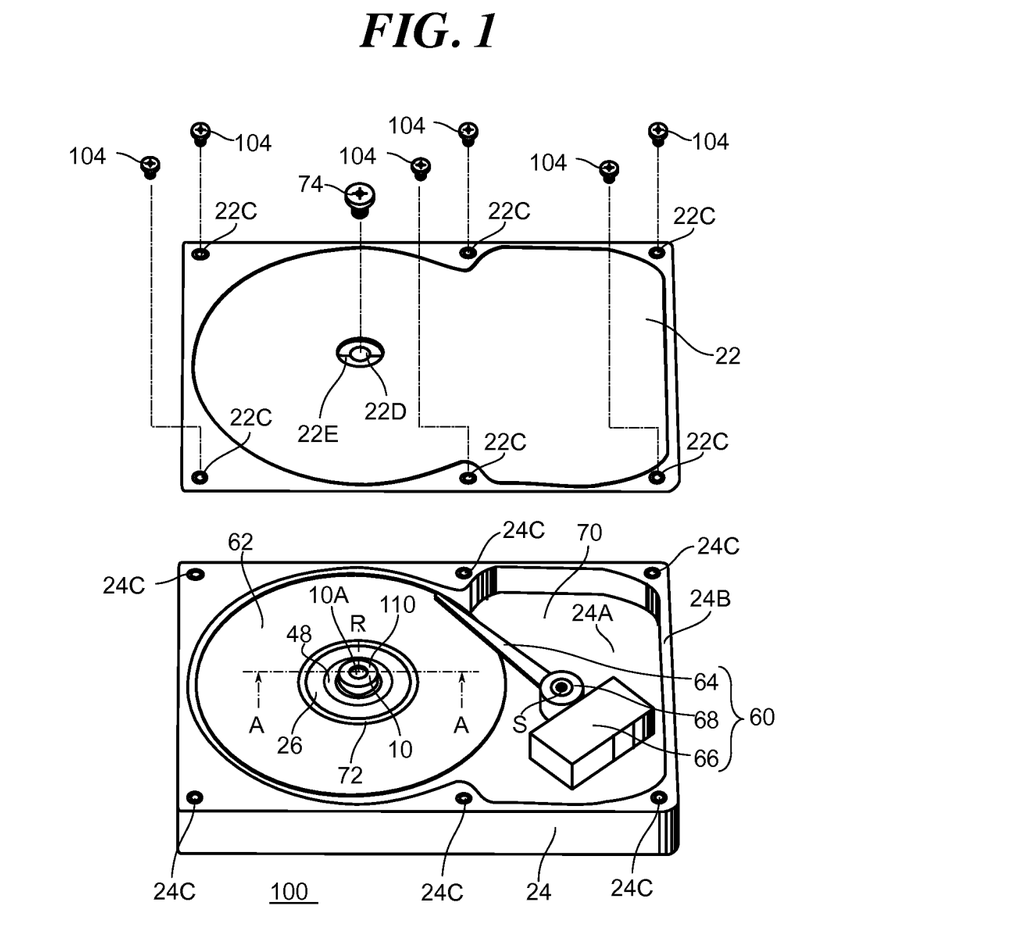
FIG. 1 is an exploded perspective view showing a rotating device according to an embodiment of the present invention.

FIG. 1 is a perspective view showing a rotating device 100 according to an embodiment of the present invention. FIG. 1 shows a condition in which a top cover 22 is detached to facilitate understanding for the present invention. A rotating device 100 includes a base 24, an upper shaft member 110, a hub 26, a magnetic recording disk 62, a data reader/writer 60, the top cover 22, a center screw 74, and for example, six peripheral screws 104.

In the following explanation, a side where the hub 26 is mounted relative to the base 24 is defined as an upper side. Moreover, a direction along the rotational axis R of a rotating body, an arbitrary direction traversing the rotational axis R on a plane orthogonal to the rotational axis R, and an arbitrary direction on such a plane are referred to as an axial direction, a radial direction, and a planar direction, respectively, in some cases. The indications of such directions are not to limit the posture of the disk drive device (the rotating device) 100 when in use, and the disk drive device 100 can be used in any posture.

The magnetic recording disk 62 is a 2.5-inch magnetic recording disk having a diameter of 65 mm and formed of a glass, and a diameter of a center hole thereof is 20 mm. If the magnetic recording disk 62 is made thin, the rigidity thereof decreases, and is warped when polished at the time of the manufacturing of the rotating device 100, thereby reducing the processing flatness. Conversely, if the magnetic recording disk 62 is made thick, the weight increases. Regarding the magnetic recording disk 62, it is proven if the thickness is within a range at least from 0.5 mm to 1.25 mm, the rigidity and the weight are practical. In this embodiment, the magnetic recording disk 62 has a thickness of from 0.7 mm to 0.9 mm, which suppresses a decrease of the processing flatness, thereby suppressing a reduction of the recording density. For example, a magnetic recording disk 62 is to be mounted on the hub 26, and is rotated together with the rotation of the hub 26. The magnetic recording disk 62 is fastened to the hub 26 by a clamper 72.

The base 24 is formed by die-cast molding of an aluminum alloy. The base 24 has a bottom plate 24A that forms the bottom of the rotating device 100, and an outer periphery wall 24B that is formed along the outer periphery of the bottom plate 24A so as to surround the region where the magnetic recording disk 62 is mounted. For example, six screw holes 24C are formed in the upper face of the outer periphery wall 24B.

The data reader/writer 60 includes a recording/playing head (unillustrated), a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the base 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw through-holes 22C provided at the periphery of the top cover 22, a cover recess 22E, and a center hole 22D provided at the center of the cover recess 22E. The top cover 22 is formed by, for example, pressing an aluminum plate or an iron-steel plate into a predetermined shape. A surface processing like plating may be applied on the top cover 22 in order to suppress corrosion. The top cover 22 is fixed to the upper face of the outer periphery wall 24B of the base 24 by, for example, the six peripheral screws 104. The six peripheral screws 104 correspond to the six screw through-holes 22C and the six screw holes 24C, respectively. In particular, the top cover 22 and the upper face of the outer periphery wall 24B are fixed with each other so as to suppress a leak into the interior of the rotating device 100 from the joined portion of the top cover 22 and the upper face of the outer periphery wall 24B. The interior of the rotating device 100 is, more specifically, a clean space 70 surrounded by the bottom plate 24A of the base 24, the outer periphery wall 24B of the base 24, and the top cover 22. This clean space 70 is designed so as to be fully sealed, i.e., so as not to have a leak-in from the exterior and a leak-out to the exterior. The clean space 70 is filled with clean air having particles eliminated. Hence, foreign materials like the particles are prevented from sticking to the magnetic recording disk 62, thereby improving the reliability of the operation of the rotating device 100. The center screw 74 corresponds to a retainer hole 10A of the upper shaft member 110. The top cover 22 is joined with an upper rod 10 to be discussed later of the upper shaft member 110 by letting the center screw 74 to pass all the way through the center hole 22D and screwing and engaging the center screw 74 into the retainer hole 10A.

Figure 2:
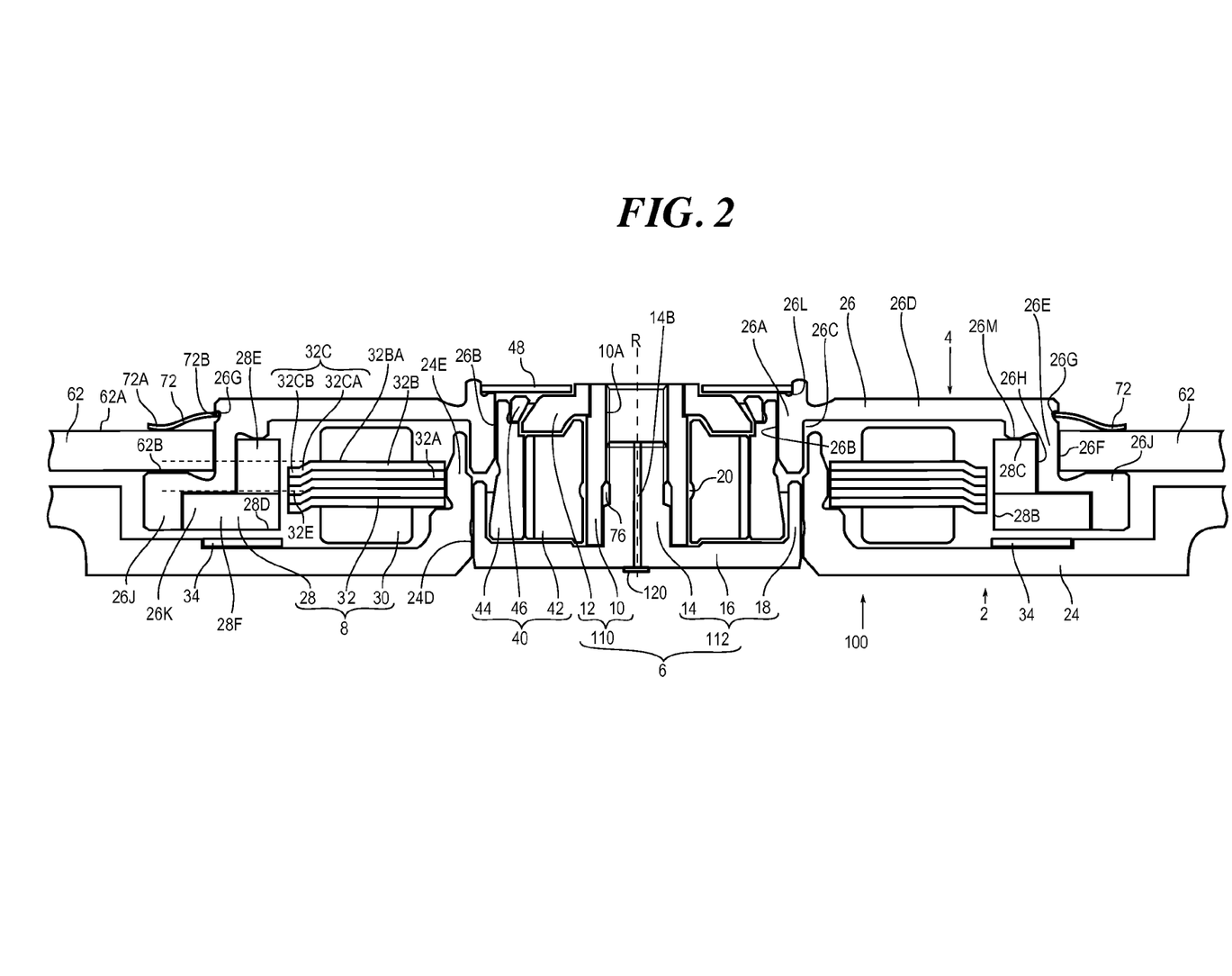
FIG. 2 is a cross-sectional view taken along a line A-A in FIG. 1.
Figure 3:
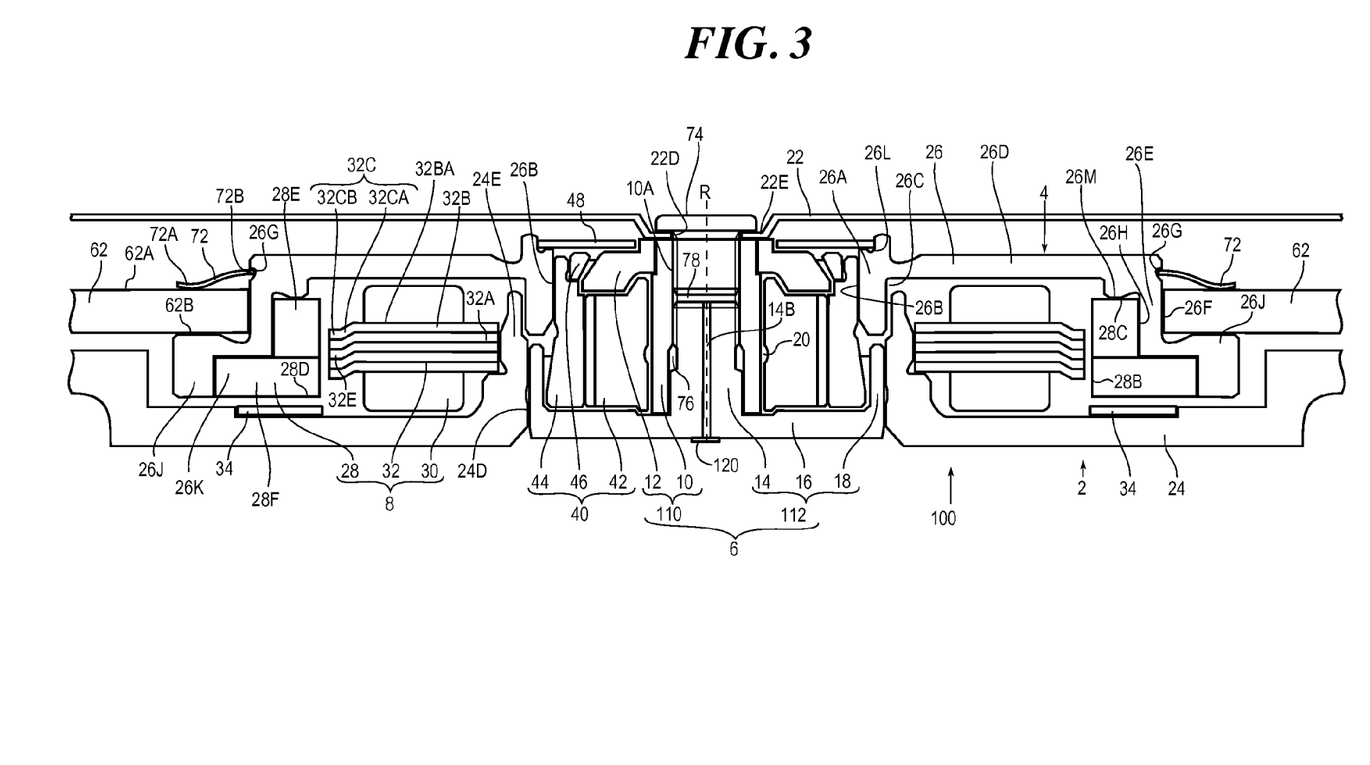
FIG. 3 is a cross-sectional view corresponding to FIG. 2 and showing a condition in which a top cover is attached.
Figure 5:
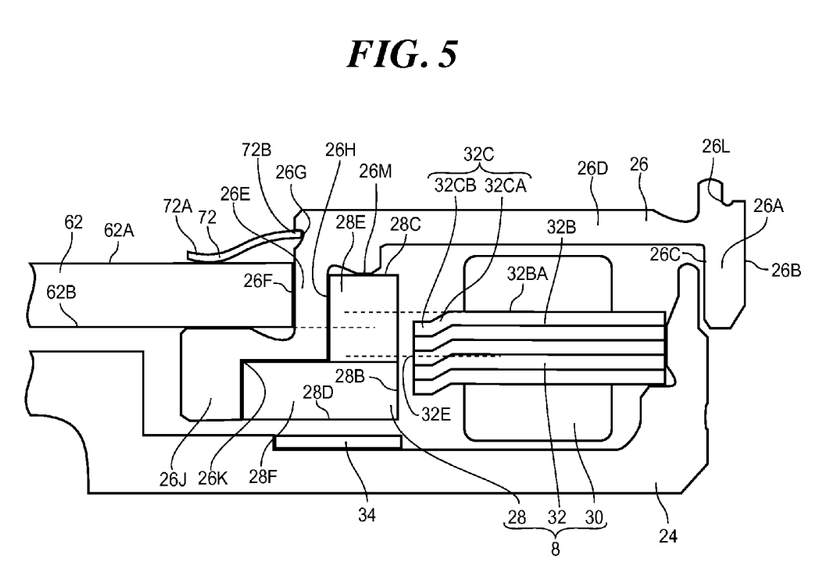
FIG. 5 is an enlarged cross-sectional view showing the circumference of a region where a stator core and a magnet face with each other in FIG. 2 in an enlarged manner.

FIG. 2 is a cross-sectional view taken along a line A-A in FIG. 1. FIG. 3 is a cross-sectional view corresponding to FIG. 2 and showing a condition in which the top cover 22 is attached. FIG. 5 is an enlarged cross-sectional view showing the circumference of a region where a stator core 32 and a magnet 30 both in FIG. 2 face with each other in an enlarged manner. FIGS. 2 and 3 are symmetrical along the rotational axis R, and the notation of a reference numeral for the same member in the right or left will be omitted in some cases.

With reference to FIG. 2, a static body 2 includes a shaft body 6, the stator core 32, coils 30, and further a magnetic ring 34. The shaft body 6 includes the upper shaft member 110 having the upper rod 10 and an upper flange 12, and a lower shaft member 112 having a lower rod 14, a lower flange 16, and a flange encircling member 18. The upper rod 10 and the lower rod 14 will be comprehensively and simply referred to as a shaft in some cases below.

A rotating body 4 includes a bearing body 40, a cap 48, and further a cylindrical magnet 28. The bearing body 40 includes a sleeve 42, a cylinder part 44, and a ring member 46. The rotating body 4 and the static body 2 have a lubricant 20 that is a lubrication medium continuously present in some spaces between the shaft body 6 and the bearing body 40. The sleeve 42 and the cylinder part 44 are members encircling the shaft, and may be denoted as a shaft encircling member in some cases.

Moreover, the shaft body 6, the bearing body 40, and the lubricant 20 configure a fluid bearing unit together with a first dynamic pressure generating groove 50, a second dynamic pressure generating groove 52, a third dynamic pressure generating groove 54, and a fourth dynamic pressure generating groove 56 to be discussed later.

The base 24 has an opening 24D around the rotational axis R of the rotating body 4, and a cylindrical protrusion 24E that encircles the opening 24D. The protrusion 24E protrudes toward the hub 26 from the upper face of the base 24.

With reference to FIG. 5, the stator core 32 has an annular part 32A and, for example, twelve protrusions running outwardly in the radial direction from the annular part 32A, and is fixed to, for example, the outer periphery of the protrusion 24E at the upper-face side of the base 24. Each protrusion has a coil placing part 32B which protrudes outwardly in the radial direction from the annular part 32A, and where the coil 30 to be discussed later is placed, and a tip 32C that protrudes outwardly in the radial direction from the coil placing part 32B. The tip 32C has a first bend 32CA bent toward the base 24, and a second bend 32CB that is a part of the first bend 32CA outwardly of the radial direction and bent along a plane orthogonal to the rotational axis R. That is, since the tip 32C is bent downwardly at the first bend 32CA, the center position of the outer periphery of the tip 32C of the stator core 32 in the axial direction is located near the base 24 beyond the center position of the coil 30 in the axial direction. Moreover, since the tip 32C has the second bend 32CB, the outer periphery of the tip 32C becomes substantially parallel to an inner periphery 28B of the magnet 28. If the bending angle of the first bend 32CA is too large, the bended part may be damaged like a crack. The first bend 32CA can be bent at an angle of, for example, equal to or smaller than 70 degrees relative to the coil placing part 32B. It is proven through tests that no crack was found within this range. According to the rotating device 100 of this embodiment, the first bend 32CA is bent at an angle of 30 to 45 degrees relative to the coil placing part 32B.

In the axial direction, the stator core 32 has an upper end face 32BA of the coil placing part 32B located upwardly of a lower face 62B of the magnetic recording disk 62. Moreover, a center 32E of the outer periphery of the tip 32C in the axial direction is located downwardly of the lower side of the lower face 62B of the magnetic recording disk 62. In other words, in the axial direction, the lower face 62B of the magnetic recording disk 62 is located between the center 32E of the outer periphery of the tip 32C of the stator core 32 in the axial direction and the upper end face 32BA of the coil placing part 32B.

The stator core 32 has the inner periphery side of the annular part 32A joined with the base 24 by press-fitting, bonding or a combination thereof. The stator core 32 is formed by, for example, laminating five magnetic steel sheets each having a thickness of, for example, 0.2 mm and integrating those by caulking. The first bend 32CA and the second bend 32CB can be formed by, performing plastic working like pressing on the tip 32C. A skin layer is provided on the surface of the stator core 32. For example, an insulative painting like electrode position coating or powder coating is applied on the surface of the stator core 32. The coil 30 is wound and provided around the coil placing part 32B of each protrusion of the stator core 32. When, for example, substantially sinusoidal drive current of three phases is caused to flow through each coil 30, a magnetic field is produced along each protrusion.

The magnetic ring 34 is a hollow ring that is thin in the axial direction, and has the inner periphery thereof disposed coaxially with the magnet 28 along the rotational axis R. The magnetic ring 34 is firmly fixed to the upper face of the base 24 by, for example, bonding, caulking, or a combination thereof. The magnetic ring 34 is formed by, for example, pressing an iron-steel plate with soft magnetism. The magnetic ring 34 has an area facing a lower face 28D of the magnet 28 in the axial direction in a non-contact manner, and provides downward suction force to the magnet 28. This configuration suppresses an uplifting of the rotating body 4 in the axial direction.

The hub 26 is provided with a first hollow annular part 26A, a disk part 26D extending outwardly of the radial direction from an outer periphery 26C of the first annular part 26A, a second annular part 26E extending downwardly in the axial direction from the outer periphery of the disk part 26D, a mount part 26J extending outwardly of the radial direction from a lower outer periphery 26F of the second annular part 26E, and a magnet recess 26K, and is formed in a substantially cup shape. That is, the second annular part 26E protrudes upwardly of the axial direction from the mounting part 26J, and the mounting part 26J is provided outwardly of the second annular part 26E in the radial direction. The magnet recess 26K is circularly provided so as to be concaved outwardly of the radial direction toward the inner periphery of the mounting part 26J, and has an inner diameter that is larger than the outer diameter of the second annular part 26E. The first annular part 26A, the disc part 26D, the second annular part 26E, and the mounting part 26J are coaxial one another along the rotational axis R. The first annular part 26A, the disk part 26D, the second annular part 26E, and the mounting part 26J are formed together. Any one of such parts may be separately formed and joined with other parts. The hub 26 is formed of an iron-steel material like SUS 430F with soft magnetism. The inner periphery of the center hole of the doughnut and annular magnetic recording disk 62 is fitted to the outer periphery 26F of the second annular part 26E of the hub 26. The magnetic recording disk 62 is mounted on the upper face of a mounting part 26J of the hub 26. A circumferential groove 26G concaved inwardly of the radial direction is provided as an engagement recess in the outer periphery 26F of the second annular part 26E. The circumferential groove 26G is located above the upper face of the magnetic recording disk 62 in the axial direction when the magnetic recording disk 62 is mounted on the hub 26. A protrusion 26M protruding downwardly of the axial direction is present on the lower face of the outer periphery of the disk part 26D. The circumferential groove 26G is located in the axial direction between the upper end of the disk part 26D and the lower end of the protrusion 26M. This configuration suppresses a reduction of the strength of the hub 26 due to the circumferential groove 26G. A recess 26L concaved outwardly of the radial direction is circularly formed in the upper part of an inner periphery 26B of the first annular part 26A.

With reference to FIG. 5, the clamper 72 is, for example, a spring washer which is thin in the axial direction, is formed in a hollow ring shape, and has an inner periphery formed in a petal shape. The clamper 72 is formed of a material with elasticity like a stainless-steel sheet. The clamper 72 is compressed in the axial direction, has an inner periphery 72B fitted in and engaged with the circumferential groove 26G, and also has an outer periphery 72A abutting the magnetic recording disk 62. As a result, the magnetic recording disk 62 is held between the clamper 72 engaged with the circumferential groove 26G and the mounting part 26J, thereby being fastened to the hub 26. In the radial direction, the clamper 72 is provided outwardly of a region where the coil 30 is placed so as to be kept out from the region where the coil 30 is placed. Moreover, the clamper 72 is provided outwardly of a region where the magnet 28 is placed in the radial direction so as to be kept out from the region where the magnet 28 is placed.

The magnet 28 is a hollow ring shape, and includes a first magnet 28F and a second magnet 28E. The first magnet 28F has an outer diameter larger than the inner diameter of the magnetic recording disk 62, and is located between the magnetic recording disk 62 and the base 24 in the axial direction with the magnetic recording disk 62 being mounted. The second magnet 28E has an outer diameter smaller than the inner diameter of the magnetic recording disk 62, and has an inner diameter equal to that of the first magnet 28F. The first magnet 28F has a thickness in the axial direction smaller than that of the second magnet 28E in the axial direction, and substantially equal to the thickness of the second magnet 28E in the radial direction.

The first magnet 28F has an outer periphery fitted with the inner periphery of the magnet recess 26K of the hub 26, and has an upper end face abutting the upper end face of the magnet recess 26K. The first magnet 28F has first magnetic poles which are 16 magnetic poles provided on the inner periphery in the circumferential direction, and has the inner periphery facing the outer periphery of the tip 32C with a clearance in the radial direction. The second magnet 28E is firmly fixed to an inner periphery 27H of the second annular part 26E, and is encircled by the magnetic recording disk 62. The second magnet 28E has second magnetic poles which are 16 magnetic poles provided on the inner periphery in the circumferential direction like the first magnetic poles, and has the inner periphery facing the outer periphery of the tip 32C with a clearance in the radial direction. The second magnetic poles are provided at positions corresponding to respective first magnetic poles. For example, each second magnetic pole can be provided at the same position as that of each first magnetic pole in the circumferential direction. Alternatively, each second magnetic pole may be provided at a position shifted from the position of each first magnetic pole in the circumferential direction by a predetermined angle. The first magnetic poles and the second magnetic poles are comprehensively referred to as drive magnetic poles in some cases below. The magnet 28 is disposed in such a way that, for example, the magnetic center of the synthesized magnetic poles of the first and second magnetic poles is located on a plane including the center of the outer periphery of the tip 32C of the stator core 32 in the axial direction and orthogonal to the rotational axis. Alternatively, the magnet 28 may be disposed in such a way that the magnetic center is located over such a plane, i.e., located at the hub-26 side.

The first magnet 28F and the second magnet 28E may be formed separately. According to the rotating device 100 of this embodiment, the first and second magnets 28F and 28E are formed together in a seamless manner. In other words, the magnet 28 has the first and second magnets 28F and 28E forming an L-shape cross section.

The magnet 28 has the outer periphery fixed to an inner periphery 26H of the hub 26 and the magnet recess 26K by, for example, bonding. An upper face 28C contacts the protrusion 26M of the hub 26. The magnet 28 is formed of a material containing, for example, neodymium, iron, and boron. The magnet 28 may contain a resin at a predetermined ratio. The magnet 28 may be formed of a material containing a ferrite magnetic material, or the laminate of a layer containing a ferrite magnetic material and a layer containing a rare-earth material like neodymium. The magnet 28 has a skin layer provided on the surface of the magnetic layer. For example, electrodeposition coating or spray coating is applied on the surface of the magnet 28. The provided skin layer suppresses an oxidation of the magnet 28, or a peeling of the surface of the magnet 28. The drive magnetic poles are provided by magnetizing the inner periphery 28B of the magnet 28.

Figure 4:
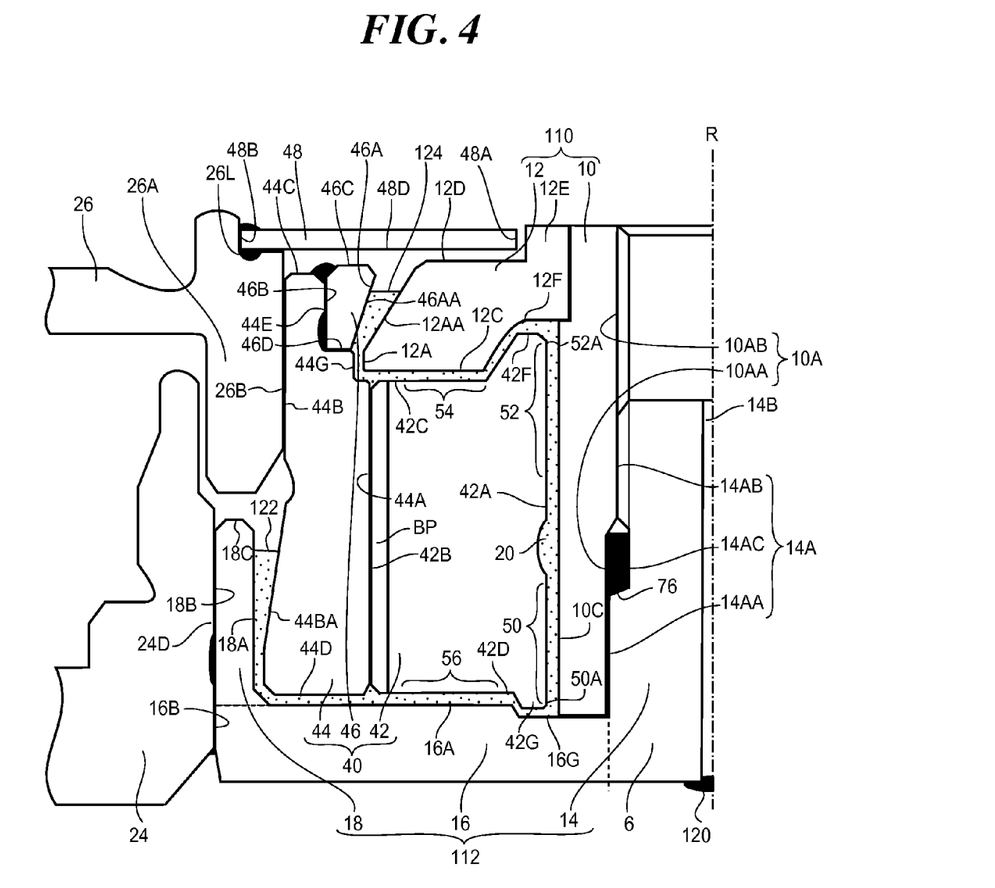
FIG. 4 is an enlarged cross-sectional view showing the circumference of a region where a lubricant is present in FIG. 2 in an enlarged manner.

An explanation will be given of a fluid bearing unit and the circumference thereof with reference to FIG. 4. FIG. 4 is an enlarged cross-sectional view showing the circumference of an area where the lubricant 20 is present in FIG. 2 in an enlarged manner. FIG. 4 shows only the left part relative to the rotational axis R.

The lower shaft member 112 includes the rod-like lower rod 14 having a passage 14B formed in the center thereof, the lower flange 16 in the disk shape extending outwardly of the radial direction from the lower end of an outer periphery 14A of the lower rod 14, and the flange encircling member 18 in the cylindrical shape protruding upwardly of the radial direction from the outer periphery edge of the lower flange 16. The lower rod 14 has, at the outer periphery 14A thereof, a male screw 14AB, a small-diameter part 14AC with a smaller diameter than that of the male screw 14AB, and a large-diameter part 14AA with a larger diameter than that of the male screw 14AB in the axial direction in this order. The small-diameter part 14AC is cylindrical and has an outer diameter formed to be smaller than the core diameter of the male screw 14AB. Moreover, the large-diameter part 14AA is also cylindrical, and has an outer diameter formed to be larger than the outer diameter of the male screw 14AB. The male screw 14AB has the outer diameter substantially equal to the outer diameter of the threaded part of the center screw 74 with the measurement error being excluded. For example, the lower shaft member 112 has the lower rod 14, the lower flange 16, and the flange encircling member 18 formed together. In this case, the manufacturing error of the lower shaft member 112 can be reduced, and eliminates a process of joining those pieces. Moreover, the deformation of the lower shaft member 112 due to shock load can be prevented. The lower shaft member 112 is formed by, for example, cutting a metallic material like SUS 303. The lower shaft member 112 may be formed of other materials like a resin and formed by other techniques like pressing and molding.

The lower flange 16 has a second recess 16G circumferentially provided in the surface facing the sleeve 42 in the axial direction, i.e., the inner periphery of an upper face 16A so as to be concaved downwardly of the axial direction. A second protrusion 42G of the sleeve 42 and a lower end of the upper rod 10 to be discussed later enter in the second recess 16G in the axial direction. The second protrusion 42G rotates in the second recess 16G in a non-contact manner therewith.

The lower shaft member 112 is fixed to the base 24 by, for example, bonding an outer periphery 18B of the flange encircling member 18 and an outer periphery 16B of the lower flange 16 to the inner periphery of the opening 24D. The lower rod 14 has a passage cover 120 that covers the lower end of the passage 14B. The passage cover 120 is formed by, for example, applying a sealant 76 to the lower end of the passage 14B and the periphery of the edge thereof, and letting the sealant 76 to be dried. The passage cover 120 may be a sheet formed of, for example, a metallic material or a resin material bonded and fixed. The flange encircling member 18 has an upper end 18C located at, for example, a region where a first dynamic pressure generating groove 50 to be discussed later is formed or above such a region in the axial direction. According to this structure, the volume of a space between an inner periphery 18A of the flange encircling member 18 and the outer periphery of the bearing body 40 to be discussed later can be increased, thereby increasing the amount of the lubricant 20 retainable. By retaining more lubricant 20, the possibility of the occurrence of a failure due to the lack of the lubricant 20 can be prevented.

The upper shaft member 110 includes the upper rod 10 in a rod shape having the retainer hole 10A formed in the center thereof and retaining the lower rod 14, and the upper flange 12 in a substantially disk shape extending outwardly of the radial direction from the upper end of an outer periphery 10C of the upper rod 10. The retainer hole 10A passes through the upper rod 10 in the axial direction. The retainer hole 10A may be a sac-like hole. The retainer hole 10A includes a female screw 10AB where a female thread is formed, and a large-diameter part 10AA formed under the female screw 10AB and having a larger diameter than that of the female screw 10AB. The large-diameter part 10AA has an inner periphery formed in a cylindrical shape, and may have an internal diameter larger than the core diameter of the female screw 10AB. For example, when the inner diameter of the large-diameter part 10AA is substantially equal to the outer diameter of the large-diameter part 14AA of the lower rod 14, the assembling precision of the upper rod 10 and the lower rod 14 can be improved. For example, the upper shaft member 110 may have the upper flange 12 formed separately from the upper rod 10 and joined therewith. The upper shaft member 110 is formed by, for example, cutting an iron-steel material like SUS 420J2. The upper shaft member 110 may be quenched in order to increase the hardness. In order to improve the dimensional precision of the upper shaft member 110, the outer periphery 10C of the upper rod 10 and a lower face 12C of the upper flange 12 may be polished. Moreover, the upper shaft member 110 may be formed of other materials like a resin and formed through other techniques like pressing and molding.

The lower rod 14 is encircled by the retainer hole 10A of the upper rod 10 and is fixed thereto. More specifically, the lower rod 14 is joined with the upper rod 10 by engaging the male screw 14AB of the lower rod 14 with the female screw 10AB of the retainer hole 10A of the upper rod 10. The sealant 76 is present in a space between the lower rod 14 and the upper rod 10 in the radial direction. Moreover, the sealant 76 may be present in a space between the upper rod 10 and the lower rod 14 in the axial direction. Furthermore, the sealant 76 may be further present in a space between the female screw 10AB of the upper rod 10 and the male screw 14AB of the lower rod 14 in the radial direction, a space between the large-diameter part 10AA of the upper rod 10 and the small-diameter part 14AC of the lower rod 14 in the radial direction, and a space between the large-diameter part 10AA of the upper rod 10 and the large-diameter part 14AA of the lower rod 14 in the radial direction, respectively. The sealant 76 suppresses a leak-out of the lubricant 20, or improves the joining strength between the lower rod 14 and the upper rod 10. The sealant 76 is, for example, an anaerobic bond.

The upper flange 12 has a tapered face 12AA formed on an outer periphery 12A and increasing the distance from the rotational axis R in the radial direction as becoming closer to the base 24. The upper flange 12 has the lower face 12C facing an upper face 42C of the sleeve 42 of the bearing body 40 to be discussed later via a clearance in the axial direction. The upper flange 12 has a flange end face 12D that extends inwardly of the radial direction from the upper end of the outer periphery 12A, and a raised part 12E raised upwardly of the axial direction from the inner end of the flange end face 12D in a substantially cylindrical shape. The upper flange 12 has a first recess 12F provided circumferentially in the surface facing the sleeve 42 in the axial direction, i.e., the lower face 12C so as to be concaved upwardly of the axial direction. A first protrusion 42F of the sleeve 42 to be discussed later enters in the first recess 12F in the axial direction. The first protrusion 42F rotates in the first recess 12F in a non-contact manner.

The bearing body 40 includes the substantially cylindrical sleeve 42 that encircles the upper rod 10, a substantially cylindrical cylinder part 44 that encircles the sleeve 42 and joined therewith, and a ring member 46 in a ring shape joined with the upper end of the cylinder part 44. The bearing body 40 has the sleeve 42 encircling the upper rod 10 via a clearance, and thus rotatable. The bearing body 40 has the sleeve 42 present between the upper flange 12 and the lower flange 16 via clearances. The bearing body 40 has the cylinder part 44 encircling the hub 26 and fixed thereto. The bearing body 40 has the cylinder part 44 encircled by the flange encircling member 18 of the lower shaft member 112 via a clearance. According to such a structure, the hub 26 is supported in a freely rotatable manner to the base 24.

The sleeve 42 and the cylinder part 44 are each formed by, for example, cutting a metallic material like brass, and applying electroless nickel plating on the surface of the cut piece. The sleeve 42 and the cylinder part 44 may be formed of other materials like a stainless-steel material. The sleeve 42 is joined with the cylinder part 44 by, for example, interference fitting like press-fitting, or bonding. The sleeve 42 and the cylinder part 44 may be subjected to plating after joined with each other. In this case, a reduction of the joining strength due to the plating layer present between the joined faces can be prevented. The sleeve 42 and the cylinder part 44 may be subjected to finishing after joined with each other. In this case, a deformation occurred at the time of joining can be corrected. The sleeve 42 and the cylinder part 44 may be formed together. In this case, the assembling precision of the sleeve 42 and the cylinder part 44 is improved.

The sleeve 42 is hollow and in a substantially cylindrical shape, and has an inner periphery 42A, an outer periphery 42B, the upper face 42C, a lower face 42D, the first protrusion 42F and the second protrusion 42G. The first protrusion 42F protrudes upwardly of the axial direction from the upper face 42C annularly, and enters in the first recess 12F of the upper flange 12 in the axial direction. The second protrusion 42G protrudes downwardly of the axial direction from the lower face 42D annularly, and enters in the second recess 16G of the lower flange 16 in the axial direction. The sleeve 42 has the inner periphery 42A encircling the upper rod 10 via a clearance. That is, respective inner peripheries of the first protrusion 42F and the second protrusion 42G face the outer periphery 10C of the upper rod 10 in the radial direction via clearances. The inner periphery 42A of the sleeve 42 has regions which face the outer periphery 10C of the upper rod 10 in the radial direction and where a first and second dynamic pressure generating grooves 50 and 52 are formed to produce radial dynamic pressure. The second dynamic pressure generating groove 52 is provided above the first dynamic pressure generating groove 50 and distant therefrom. The first and second dynamic pressure generating grooves 50 and 52 may be provided in the outer periphery 10C of the upper rod 10 instead of the sleeve 42. In the following explanation of this embodiment, the regions where the first and second dynamic pressure generating grooves 50 and 52 are provided are referred to as radial-dynamic-pressure-groove disposed regions in some cases.

In order to generate thrust dynamic pressure, a third dynamic pressure generating groove 54 is provided in the region of the upper face 42C of the sleeve 42 facing the upper flange 12 in the axial direction. The third dynamic pressure generating groove 54 may be provided in the region of the lower face 12C of the upper flange 12 facing the sleeve 42 in the axial direction instead of the sleeve 42. In order to generate thrust dynamic pressure, also, a fourth dynamic pressure generating groove 56 is provided in the region of the lower face 42D of the sleeve 42 facing the lower flange 16 in the axial direction. The fourth dynamic pressure generating groove 56 may be provided in the region of the upper face 16A of the lower flange 16 facing the sleeve 42 in the axial direction instead of the sleeve 42. In the following explanation of this embodiment, the region where the third or fourth dynamic pressure generating groove 54 or 56 is provided is referred to as a thrust-dynamic-pressure-groove disposed region in some cases.

According to this embodiment, a part of the second dynamic pressure generating groove 52 is provided in either one of the surface of the first protrusion 42F and the surface of the upper rod 10 facing with each other in the radial direction. That is, in the axial direction, an end 52A of the radial-dynamic-pressure-groove disposed region distant from the lower flange 16 is located outwardly, i.e., upwardly of the region where the third dynamic pressure generating groove 54 is disposed. Moreover, a part of the first dynamic pressure generating groove 50 is provided in either one of the surface of the second protrusion 42G and the surface of the upper rod 10 facing with each other in the radial direction. That is, in the axial direction, an end 50A of the radial-dynamic-pressure-groove disposed region distant from the upper flange 12 is located outwardly, i.e., downwardly of the region where the fourth dynamic pressure generating groove 56 is disposed.

The first and second dynamic pressure generating grooves 50 and 52 are formed in, for example, a herringbone shape. The first and second dynamic pressure generating grooves 50 and 52 may be formed in other shapes like a spiral shape. The third and fourth dynamic pressure generating grooves 54 and 56 are formed in, for example, a herringbone shape. The third and fourth dynamic pressure generating grooves 54 and 56 may be formed in other shapes like a spiral shape. The first, second, third, and fourth dynamic pressure generating grooves 50, 52, 54, and 56 are formed by, for example, pressing, ball rolling, etching, or cutting. Respective dynamic pressure generating grooves may be formed by different manufacturing techniques.

The cylinder part 44 is hollow and in a substantially cylindrical shape, and includes an inner periphery 44A, an outer periphery 44B, an upper face 44C, a lower face 44D, and a recess 44E circumferentially provided in the upper end of the inner periphery 44A so as to be concaved outwardly of the radial direction. The inner periphery 44A is joined with the sleeve 42. The lower face 44D of the cylinder part 44 is located upwardly of the lower face 42D of the sleeve 42. That is, a clearance between the lower face 44D and the upper face 16A of the lower flange 16 is wider than a clearance between the lower face 42D and the upper face 16A. The upper portion of the outer periphery 44B is joined with the inner periphery 26B of the first annular part 26A of the hub 26. The lower portion of the region of the outer periphery 44B joined with the hub 26 is encircled by the flange encircling member 18 via a clearance. The outer periphery 44B has an inclined face 44BA that reduces its radius as becoming closer to the upper end of the inner periphery 18A of the flange encircling member 18 in a region facing therewith in the radial direction. The clearance between the inclined face 44BA and the inner periphery 18A in the radial direction defines a tapered space gradually expanding as it goes upwardly in the axial direction. The inclined face 44BA and the inner periphery 18A contact an encircling-member-side air-liquid interface 122 of the lubricant 20 to be discussed later, and configure a capillary seal that prevents the lubricant 20 from spilling out by capillary force. For example, the encircling-member-side air-liquid interface 122 is leveled with or located upwardly of the region where the first dynamic pressure generating groove 50 is disposed in the axial direction. According to such a structure, a larger amount of the lubricant 20 can be retained, thereby reducing the possibility of the occurrence of a failure due to the lack of the lubricant 20. For example, the encircling-member-side air-liquid interface 122 is provided outwardly of the third and fourth dynamic pressure generating grooves 54 and 56 in the radial direction.

The ring member 46 is hollow and is in a ring shape, and has an inner periphery 46A, an outer periphery 46B, an upper face 46C, and a lower face 46D. The ring member 46 is formed by, for example, cutting a stainless-steel material like SUS 303 or SUS 430. The ring member 46 has the outer periphery 46B and the lower face 46D fitted in the recess 44E of the cylinder part 44, and is bonded and fixed thereto. The ring member 46 has an inclined face 46AA formed in the inner periphery 46A and reducing the radius as becoming closer to the upper end thereof. A clearance between the inclined face 46AA of the ring member 46 and the tapered face 12AA of the upper flange 12 in the radial direction defines a tapered space gradually expanding as it goes up in the axial direction. The inclined face 46AA of the ring member 46 and the tapered face 12AA of the upper flange 12 contact a flange-side air-liquid interface 124 of the lubricant 20 to be discussed later, and configure a capillary seal that prevents the lubricant 20 from spilling out by capillary force.

The cap 48 is thin in the axial direction and is in a hollow ring shape, and has an inner periphery 48A, an outer periphery 48B, an upper face, and a lower face 48D. The cap 48 is formed by, for example, cutting a stainless-steel material like SUS 303 or SUS 430. The cap 48 may be formed of other metallic materials or resin materials by pressing, molding, etc. The cap 48 has the outer periphery 48B fitted in the recess 26L of the inner periphery 26B of the first annular part 26A of the hub 26, and bonded and joined therewith. Accordingly, the cap 48 rotates together with the bearing body 40. The cap 48 has the lower face 48D that covers the flange-side air-liquid interface 124. The cap 48 has the inner periphery 48A encircling the side face of the raised part 12E of the upper flange 12 in a non-contact manner. The lower face 48D of the cap 48 has an inner periphery facing the flange end face 12D of the upper flange 12 in a non-contact manner in the axial direction. In other words, the cap 48 covers a part of the flange end face 12D of the upper flange 12. The cap 48 and the upper flange 12 define a labyrinth for the lubricant 20, thereby suppressing a spill-out of the lubricant 20.

The lubricant 20 is continuously present in a clearance between the bearing body 40 and the shaft body 6 from the encircling-member-side air-liquid interface 122 to the flange-side air-liquid interface 124. For example, the lubricant 20 is present in the clearance between the inclined face 44BA and the inner periphery 18A in the radial direction, the clearance between the cylinder part 44 and the lower flange 16 in the axial direction, the clearance between the sleeve 42 and the lower flange 16 in the axial direction, the clearance between the sleeve 42 and the upper rod 10 in the radial direction, the clearance between the upper flange 12 and the sleeve 42 in the axial direction, the clearance between the upper flange 12 and the cylinder part 44 in the radial direction, and the clearance between the tapered face 12AA and the inclined face 46AA in the radial direction. When the bearing body 40 rotates relative to the shaft body 6, the first, second, third, and fourth dynamic pressure generating grooves 50, 52, 54, and 56 respectively generate dynamic pressures to the lubricant 20. The rotating body 4 having the bearing body 40 fixed by such dynamic pressures is supported in the radial direction and axial direction in a non-contact manner with the static body 2 having the shaft body 6 fixed.

The bearing body 40 has, in addition to the clearance in the radial direction between the sleeve 42 and the upper rod 10, a passage BP for the lubricant 20 which causes the clearance in the axial direction between the upper flange 12 and the sleeve 42 and the clearance in the axial direction between the sleeve 42 and the lower flange 16 to be communicated with each other. For example, the passage BP is provided outwardly of the regions where the third and fourth dynamic pressure generating grooves 54 and 56 are provided, respectively, in the radial direction. For example, the passage BP may include a passage provided in the sleeve 42 in the axial direction. The passage BP may be provided in the cylinder part 44 instead of the sleeve 42. The passage BP reduces a difference in pressure between the clearance in the axial direction between the upper flange 12 and the sleeve 42 and the clearance in the axial direction between the sleeve 42 and the lower flange 16. This results in the reduction of the possibility that the lubricant 20 leaks out.

Next, with reference to FIG. 3, an explanation will be given of a structure having the top cover 22 joined with the shaft body 6.

The top cover 22 is joined with the upper rod 10 of the shaft body 6 by allowing a fastener to be engaged with the retainer hole 10A. More specifically, the center screw 74 passes all the way through the center hole 22D of the top cover 22, and is engaged with a part of the female screw of the retainer hole 10A of the upper rod 10. The periphery edge of the center hole 22D of the cover recess 22E is held between the flange of the center screw 74 and the upper end face of the upper rod 10, and thus the top cover 22 is fixed to the upper rod 10.

According to the structure having both ends of the shaft body 6 fixed to a chassis including the base 24 and the top cover 22, the vibration resistance characteristic, etc., of the rotating device 100 is enhanced.

The upper rod 10 is provided with a gas accumulator 78 that accumulates air in a space between the lower end of the center screw 74 of the retainer hole 10A and the upper end of the lower rod 14 in the axial direction. The gas accumulator 78 is communicated with the passage 14B of the lower rod 14. When the sealant 76 not cured yet is present between the retainer hole 10A and the outer periphery 14A, the sealant 76 is being cured while producing volatile components contained therein. Since the gas accumulator 78 is provided, the volatile components of the sealant 76 are efficiently evacuated to the exterior through the gas accumulator 78 and the passage 14B. As a result, the curing time of the sealant 76 can be short, thereby reducing the work hours. Moreover, after a predetermined time has elapsed after such an assembling work, the passage cover 120 is provided so as to block off the passage 14B. This reduces the possibility of a leak-in of foreign materials into the region where the lubricant 20 is present through the passage 14B, the gas accumulator 78, and the space between the upper rod 10 and the lower rod 14.

Next, an explanation will be given of an example method of manufacturing the rotating device 100.

(1) The sleeve 42 has the outer periphery 42B fixed to the inner periphery 44A of the cylinder part 44 by, for example, press-fitting. Bonding or press-fitting-bonding may be applied instead of press-fitting (see FIG. 4).

(2) The first and second dynamic pressure generating grooves 50 and 52 are provided in the inner periphery 42A of the sleeve 42. The third and fourth dynamic pressure generating grooves 54 and 56 are provided in the upper face 42C of the sleeve 42 and the lower face 42D thereof, respectively.

(3) The lower rod 14 fixed to the lower flange 16 is inserted into the retainer hole 10A of the upper rod 10 up to a predetermined insertion position (see FIG. 4). For example, the lower rod 14 is inserted in the retainer hole 10A in such a way that the male screw 14AB of the lower rod 14 is engaged with the female screw 10AB of the retainer hole 10A of the upper rod 10. At this time, the sealant 76 is applied to at least either one of the outer periphery 14A of the lower rod 14 and the retainer hole 10A to engage the male screw 14AB with the female screw 10AB. The sleeve 42 fixed to the cylinder part 44 is fitted with the upper rod 10.

(4) The upper flange 12 is fixed to the upper end of the upper rod 10 by, for example, press-fitting. Bonding or press-fitting-bonding may be applied instead of press-fitting (see FIG. 4). In this condition, a dimension P1 of the play of the sleeve 42 in the axial direction between the upper flange 12 and the lower flange 16 and a dimension is inspected.

(5) The insertion position of the lower rod 14 in the retainer hole 10A of the upper rod 10 is changed depending on a dimension P0 of a desired play of the sleeve 42 in the axial direction and the inspected dimension P1 of the play in the axial direction between the upper flange 12 and the lower flange 16. For example, the insertion position can be changed by a distance corresponding to a difference between P0 and P1. For example, by rotating the male screw 14AB engaged with the female screw 10AB, the insertion position can be changed.

(6) The ring member 46 is fixed to the cylinder part 44 by, for example, press-fitting. Bonding or press-fitting-bonding may be applied instead of press-fitting (see FIG. 4).

(7) An assembly of the shaft body 6 and the bearing body 40 in the condition explained in (6) is left stationary under a high-temperature atmosphere to let the sealant 76 cured, thereby fixing and bonding the lower rod 14 with the upper rod 10. For example, the shaft body 6 and the bearing body 40 are left stationary in a hot bath filled with clean air of 60 to 120° C., for 30 to 120 minutes, thereby letting the sealant 76 cured.

(8) The lubricant 20 is filled in the predetermined space between the bearing body 40 and the shaft body 6. Accordingly, the fluid bearing unit is fabricated (see FIG. 4). For example, the assembly of the shaft body 6 and the bearing body 40 with the sealant 76 being cured is set to a jig under a reduced-pressure atmosphere, a predetermined amount of the lubricant 20 is applied to a portion that will be an open end of the region where the lubricant 20 is present between the shaft body 6 and the bearing body 40, and the atmosphere is subjected to pressure recovery, thereby filling the lubricant 20.

(9) For the fluid bearing unit after the lubricant 20 is filled, at least either one of the encircling-member-side air-liquid interface 122 or the flange-side air-liquid interface 124 of the filled lubricant 20 is taken as an air-liquid interface subjected to an inspection, and the position thereof in the axial direction is inspected. For example, the air-liquid interface subjected to an inspection is irradiated with laser light, and the position of such an air-liquid interface can be inspected in accordance with reflected light. Moreover, laser light may be emitted to the upper face 12D of the flange 12 to inspect the position of the upper face 12D in accordance with reflected light. According to such schemes, it is possible to inspect the relative position of the air-liquid interface subjected to the inspection to the upper face 12D. For the fluid bearing unit subjected to the inspection, if the position of the air-liquid interface subjected to the inspection is out of the predetermined range, adjustment, etc., may be performed.

(10) The magnet 28 is fixed to the hub 26 by, for example, bonding (see FIG. 3).

(11) The outer periphery 44B of the cylinder part 44 of the fluid bearing unit having undergone the inspection of (9) is fixed to the inner periphery 26B of the first annular part 26A of the hub 26 by, for example, press-fitting. Bonding or press-fitting-bonding may be applied instead of press-fitting (see FIG. 4).

(12) The cap 48 is fixed in the recess 26L of the first annular part 26A by, for example, press-fitting. Bonding or press-fitting-bonding may be applied instead of press-fitting (see FIG. 4).

(13) The stator core 32 having the coils 30 wound therearound is fixed to the base 24 by, for example, press-fitting. Bonding or press-fitting-bonding may be applied instead of press-fitting (see FIG. 3).

(14) The flange encircling member 18 of the fluid bearing unit is fitted in the opening 24D of the base 24, and is bonded and fixed thereto (see FIG. 4).

(15) The magnetic recording disk 62 is joined with the hub 26 by the clamper 72 (see FIG. 3).

(16) The data reader/writer 60 and other members are attached to the base 24.

(17) By causing the center screw 74 to pass all the way through the center hole 22D and to be engaged with a part of the female screw 10AB of the retainer hole 10A of the upper rod 10, the top cover 22 is joined with the upper rod 10 (see FIG. 3). A sealant may be applied to the flange of the center screw 74.

(18) The top cover 22 is joined with the base 24 by the peripheral screws 104. The rotating device 100 is manufactured through a predetermined inspection and other processes.

The method and process procedures thereof for manufacturing the rotating device 100 are merely examples, and the rotating device 100 can be manufactured by other methods and process procedures.

Next, an explanation will be given of an operation of the rotating device 100 structured as explained above. In order to rotate the magnetic recording disk 62, a drive current of three phases is supplied to the coils 30. When the drive current flows through respective coils 30, field magnetic fluxes are produced along the protrusions of the stator core 32. A mutual effect of such field magnetic fluxes and the magnetic fluxes of the drive magnetic poles of the magnet 28 applies torque to the magnet 28, and thus the hub 26 and the magnetic recording disk 62 engaged therewith rotate. While at the same time, the voice coil motor 66 swings the swing arm 64, and thus the recording/playing head comes and goes within the swinging range over the magnetic recording disk 62. The recording/playing head converts magnetic data recorded in the magnetic recording disk 62 into electric signals, and transmits the electric signals to a control substrate (unillustrated), and writes data transmitted from the control substrate in the form of electric signals on the magnetic recording disk 62 as magnetic data.

The rotating device 100 of this embodiment structured as explained above has following advantages.

According to the structure having the bearing body held between the upper flange and the lower flange, the region where the radial dynamic bearing is formed is restricted by the upper flange and the lower flange, and it is difficult to elongate the axial span of the radial dynamic bearing. According to the rotating device 100 of this embodiment, however, as explained above, the first or second protrusion 42F or 42G is provided, which enables elongation of the axial span of the radial dynamic bearing.

According to a structure in which, for example, an end in the axial direction of a region which is filled with the lubricant in the axial direction like the passage BP directly or linearly connected to the air-liquid interface, in general, a resistance of a flow channel from such a region to the air-liquid interface is small. When the resistance of such a flow channel is small, if the rotating device 100 receives shock due to falling, it is highly possible that the lubricant in such a region is spilled out from the air-liquid interface. According to the rotating device 100 of this embodiment, however, the cylinder part 44 has an annular recess 44G concaved annularly in the inner periphery 44A and outwardly of the radial direction, and a part of the outer periphery 12A of the upper flange 12 enters the annular recess 44G in the radial direction. Accordingly, the end of the passage BP in the axial direction is covered by the upper flange 12, and the resistance of the flow channel of the lubricant 20 increases. As a result, the movement of the lubricant 20 in the axial direction due to falling shock becomes calm, thereby reducing the possibility that the lubricant 20 is spilled out from the air-liquid interface 124.

When the rotating device 100 receives shock due to falling, the boundary part between the lower rod 14 of the shaft body 6 and the lower flange 16 may be damaged. However, according to the rotating device 100 of this embodiment, the shaft body 6 has the lower rod 14 and the lower flange 16 formed together, and thus the boundary part between the lower rod 14 and the lower flange 16 can withstand such shock. Moreover, since the lower rod 14, the lower flange 16, and the flange encircling member 18 are formed together, the labor hours for assembling can be reduced and the work efficiency is improved, and the dimension error among the lower rod 14, the lower flange 16, and the flange encircling member 18 can be reduced.

Moreover, when the upper rod 10 and the lower rod 14 are simply bonded and fixed with each other, respective joined portions thereof may be damaged when shock is applied. However, according to the rotating device 100 of this embodiment, the male screw 14AB of the lower rod 14 is engaged with the female screw 10AB of the upper rod 10, to fix the upper rod 10 and the lower rod 14, and thus the joined portions thereof can withstand shock.

Furthermore, there is a structure in which the clamper that fastens the magnetic recording disk on the hub is fixed to the upper end face of the hub. According to such a structure, when the dimension of the rotating device in the axial direction is restricted, the hub may be made thin by what corresponds to the clamper. If the hub is made thin, the strength of the thinned portion decreases, and thus such a portion may be damaged when shock is applied. According to the rotating device 100 of this embodiment, however, the clamper 72 is fitted in the circumferential groove 26G of the outer periphery 26F of the hub 26, thereby avoiding the reduction of the strength.

According to a structure in which the clamper is stacked over in the axial direction the coil disposed area or the magnet disposed area, because of the presence of the clamper, the coil disposed area or the magnet disposed area are reduced, resulting in the decrease of torque or the increase of power consumption. However, according to the rotating device 100 of this embodiment, the clamper 72 is located outwardly of the area where the coils 30 or the magnet 28 is disposed in the radial direction. Hence, it is possible to suppress the reduction of torque and the increase of power consumption due to the presence of the clamper.

The explanation was given of the structure and the operation of the rotating device according to the embodiment of the present invention, but the embodiment explained above is merely to illustrate the present invention, and it should be understood by those skilled in the art that the combination of respective structural elements permits various modifications, and such modifications are within the scope and spirit of the present invention.

According to the embodiment, the explanation was given of the case in which the shaft is configured in such a way that the upper rod 10 and the lower rod 14 are separately formed and joined together later, but the present invention is not limited to this case. For example, the upper rod 10, the lower rod 14, the lower flange 16, and the flange encircling member 18 may be formed together. It can reduce the manufacturing error of the lower flange 16 and the flange encircling member 18 relative to the upper rod 10. After the bearing body 40 is fitted to the shaft in this condition, it becomes possible to join the upper flange 12 to the shaft.

According to the embodiment, the explanation was given of the case in which the lower shaft member is directly attached to the base, but the present invention is not limited to this case. For example, a brushless motor including a rotating body and a static body may be separately formed, and such a brushless motor may be attached to a chassis.

According to the embodiment, although the explanation was given of the case in which the stator core is encircled by the magnet, the present invention is not limited to this case. For example, the magnet may be encircled by the stator core.

What is claimed is:

1. A rotating device comprising:
    a shaft body comprising a shaft, a first flange extending outwardly of a radial direction from a side face of the shaft at an end, and a second flange extending outwardly of the radial direction from a side face of the shaft at another end;
    a bearing body comprising a shaft encircling member which is present in a space between the first flange and the second flange in an axial direction and which encircles the shaft, and being freely rotatable relative to the shaft body;
    a radial dynamic pressure generating groove provided in either one of an outer periphery of the shaft and an inner periphery of the shaft encircling member;
    a first thrust dynamic pressure generating groove provided in either one of a surface of the first flange and a surface of the shaft encircling member, which surfaces face each other in the axial direction; and
    a lubricant present in a space between the shaft body and the bearing body;
    wherein:
    an end of a region where the radial dynamic pressure generating groove is disposed and which is most distant from the second flange is located more distant in the axial direction from the second flange than a region where the first thrust dynamic pressure generating groove is disposed;
    the rotating device further comprises a flange encircling member which extends toward the first flange from an outer periphery of the second flange in the axial direction, joined together with the second flange, and encircles the shaft encircling member via a clearance;
    the clearance between an inner periphery of the flange encircling member and an outer periphery of the shaft encircling member in the radial direction becomes wider in the axial direction toward the first flange; and
    the lubricant forms an air-liquid interface that contacts the inner periphery of the flange encircling member and the outer periphery of the shaft encircling member.

2. The rotating device according to claim 1, further comprising a capillary seal which is disposed at an outer periphery of the first flange and which suppresses a leak-out of the lubricant by capillary force,
    wherein the region where the radial dynamic pressure generating groove is disposed partially overlaps a region where the capillary seal is disposed in the axial direction.

3. The rotating device according to claim 1, wherein the second flange is formed integrally with the shaft.

4. The rotating device according to claim 1, wherein:
    the second flange comprises a recess formed in a surface of the second flange facing the shaft encircling member in the axial direction and recessed in the axial direction,
    the shaft encircling member comprises a protrusion corresponding to the recess of the second flange and protruding in the axial direction, and
    an inner periphery of the protrusion directly faces the outer periphery of the shaft in the radial direction.

5. The rotating device according to claim 4, wherein a part of the radial dynamic pressure generating groove is provided in either one of a surface of the protrusion and a surface of the shaft, which surfaces face each other in the radial direction.

6. The rotating device according to claim 1, further comprising a second thrust dynamic pressure generating groove provided in either one of a surface of the second flange and a surface of the shaft encircling member, which surfaces face each other in the axial direction, wherein a distance between an end of the region where the radial dynamic pressure generating groove is disposed and which is most distant from the first flange and another end of the region where the radial dynamic pressure generating groove is disposed and which is most distant from the second flange in the axial direction is larger than a distance between the first thrust dynamic pressure generating groove and the second thrust dynamic pressure generating groove in the axial direction.

7. The rotating device according to claim 1, wherein:
the shaft encircling member comprises a sleeve that encircles the shaft, and a cylinder part that encircles the sleeve,
the cylinder part comprises an annular recess formed in an inner periphery of the cylinder part and annularly recessed outwardly of the radial direction, and
the first flange enters in the annular recess in the radial direction.

8. The rotating device according to claim 1, further comprising:
a base that fixes the second flange; and
a stator core fixed to the base and disposed outwardly of the bearing body in the radial direction,
wherein the stator core comprises:
an annular part that annularly surrounds the bearing body;
a coil placing part which protrudes outwardly of the radial direction from the annular part and where a coil is placed; and
a tip which protrudes outwardly of the radial direction from the coil placing part and which is bent toward the base relative to the coil placing part.

9. The rotating device according to claim 1, wherein the shaft comprises:
an upper rod joined with the first flange; and
a lower rod coaxially fitted in the upper rod and joined with the second flange.

10. A rotating device comprising:
a shaft body comprising a shaft, a first flange extending outwardly of a radial direction from a side face of the shaft at an end, and a second flange extending outwardly of the radial direction from a side face of the shaft at another end;
a bearing body comprising a shaft encircling member which is present in a space between the first flange and the second flange in an axial direction and which encircles the shaft, and being freely rotatable relative to the shaft body;
a radial dynamic pressure generating groove provided in either one of an outer periphery of the shaft and an inner periphery of the shaft encircling member;
a first thrust dynamic pressure generating groove provided in either one of a surface of the first flange and a surface of the shaft encircling member, which surfaces face each other in the axial direction;
a second thrust dynamic pressure generating groove provided in either one of a surface of the second flange and a surface of the shaft encircling member, which surfaces face each other in the axial direction; and
a lubricant present in a space between the shaft body and the bearing body;
wherein:
a distance between an end of the region where the radial dynamic pressure generating groove is disposed and which is most distant from the first flange and another end of the region where the radial dynamic pressure generating groove is disposed and which is most distant from the second flange in the axial direction is larger than a distance between the first thrust dynamic pressure generating groove and the second thrust dynamic pressure generating groove in the axial direction;
the first flange comprises a first recess formed in the surface of the first flange facing the shaft encircling member in the axial direction and recessed in the axial direction;
the shaft encircling member comprises a first protrusion corresponding to the first recess of the first flange and protruding in the axial direction;
an inner periphery of the first protrusion directly faces the outer periphery of the shaft in the radial direction;
the rotating device further comprises a flange encircling member which extends toward the first flange from an outer periphery of the second flange in the axial direction, joined together with the second flange, and encircles the shaft encircling member via a clearance;
the clearance between an inner periphery of the flange encircling member and an outer periphery of the shaft encircling member in the radial direction becomes wider in the axial direction toward the first flange; and
the lubricant forms an air-liquid interface that contacts the inner periphery of the flange encircling member and the outer periphery of the shaft encircling member.

11. The rotating device according to claim 10, wherein a part of the radial dynamic pressure generating groove is provided in either one of a surface of the first protrusion and a surface of the shaft, which surfaces face each other in the radial direction.

12. The rotating device according to claim 10, wherein the second flange is formed integrally with the shaft.

13. The rotating device according to claim 10, wherein:
the second flange comprises a second recess formed in a surface of the second flange facing the shaft encircling member in the axial direction and recessed in the axial direction,
the shaft encircling member comprises a second protrusion corresponding to the second recess of the second flange and protruding in the axial direction, and
an inner periphery of the second protrusion directly faces the outer periphery of the shaft in the radial direction.

14. The rotating device according to claim 13, wherein a part of the radial dynamic pressure generating groove is provided in either one of a surface of the second protrusion and a surface of the shaft, which surfaces face each other in the radial direction.

15. The rotating device according to claim 10, wherein:
the shaft encircling member comprises a sleeve that encircles the shaft, and a cylinder part that encircles the sleeve,
the cylinder part comprises an annular recess formed in an inner periphery of the cylinder part and annularly recessed outwardly of the radial direction, and
the first flange enters in the annular recess in the radial direction.

16. The rotating device according to claim 10, further comprising:
a base that fixes the second flange; and
a stator core fixed to the base and disposed outwardly of the bearing body in the radial direction,
wherein the stator core comprises:
an annular part that annularly surrounds the bearing body;
a coil placing part which protrudes outwardly of the radial direction from the annular part and where a coil is placed; and a tip which protrudes outwardly of the radial direction from the coil placing part and which is bent toward the base relative to the coil placing part.

17. The rotating device according to claim 10, wherein the shaft comprises:
   an upper rod joined with the first flange; and
   a lower rod coaxially fitted in the upper rod and joined with the second flange.

18. A rotating device comprising:
   a shaft body comprising a shaft, a first flange extending outwardly of a radial direction from a side face of the shaft at an end, and a second flange extending outwardly of the radial direction from a side face of the shaft at another end;
   a bearing body comprising a shaft encircling member which is present in a space between the first flange and the second flange in an axial direction and which encircles the shaft, and being freely rotatable relative to the shaft body;
   a radial dynamic pressure generating groove provided in either one of an outer periphery of the shaft and an inner periphery of the shaft encircling member;
   a first thrust dynamic pressure generating groove provided in either one of a surface of the first flange and a surface of the shaft encircling member, which surfaces face each other in the axial direction; and
   a lubricant present in a space between the shaft body and the bearing body;
   wherein:
   an end of a region where the radial dynamic pressure generating groove is disposed and which is most distant from the second flange is located more distant in the axial direction from the second flange than a region where the first thrust dynamic pressure generating groove is disposed; and
   the shaft comprises:
      an upper rod joined with the first flange; and
      a lower rod coaxially fitted in the upper rod and joined with the second flange; and
      a sealant is present in a space between the upper rod and the lower rod in the axial direction.

* * * * *